United States Patent Office 3,188,234
Patented June 8, 1965

3,188,234
VINYLIDENE CHLORIDE TERPOLYMER AS A COATING FOR REGENERATED CELLULOSE FILM
Harold G. Hahn, Midland, Eugene E. Kochaney, Bay City, and Wallace J. Miles and James H. Modeen, Midland, Mich., assignors to The Dow Chemical Company, Midland, Mich., a corporation of Delaware
No Drawing. Filed May 2, 1962, Ser. No. 191,721
6 Claims. (Cl. 117—145)

This invention relates to moistureproof, heat-sealable, flexible, transparent film, and more particularly to the production of a film comprising regenerated cellulose coated with a moistureproof, heat-sealable, flexible, transparent coating of organic polymeric material, which coating tightly adheres to the base film even under high moisture conditions.

The coating of flexible, transparent, regenerated cellulose film and the like with vinyl polymers and copolymers for the purpose of rendering the film moisture-resistant, heat-sealable, and otherwise improving the properties thereof is well known. Because they are tough, flexible, strong, odorless, transparent, heat-sealable and inherently moisture-resistant, thin coatings of vinylidene chloride/acrylonitrile copolymers particularly recommend themselves for this purpose. Coatings of vinylidene chloride/acrylonitrile copolymers comprising at least 80 percent of vinylidene chloride have excellent moistureproofness but their adhesion to the base film under high moisture conditions, such as are encountered when the coated film is wrapped around products containing considerable water (cheese, fish, fresh vegetables, etc.), is very poor. In order to improve the adhesion, it is currently necessary to first apply an anchoring sub-coating and then the vinylidene chloride/acrylonitrile coating, which represents a costly and time consuming extra processing step and, hence, a commercial disadvantage.

An object of this invention therefore is to improve the adherence or anchorage to the base film of transparent, moistureproof, heat-sealable coatings of vinylidene chloride interpolymers.

Another object is to provide a regenerated cellulose film having in direct contact therewith a well-adhered, moistureproof, heat-sealable, transparent coating of vinylidene chloride terpolymer.

Still another object is to provide moistureproof, heat-sealable, transparent coatings of vinylidene chloride terpolymer, which terpolymer strongly adheres directly to base materials, such as regenerated cellulose film, even when the coated base material is maintained in an atmosphere of high moisture content or in direct contact with water for a considerable period of time.

Other and related objects will become evident from the following specification and claims.

These objects are realized, according to the invention, by coating a base film or sheet of regenerated cellulose, by any convenient coating technique, with a coating composition comprising as the film-forming component essentially a terpolymer obtained by polymerizing a mixture of (1) between about 80 and 93 weight percent of vinylidene chloride, (2) between about 4.5 and 19.5 weight percent of a copolymerizable monoethylenically unsaturated monomer, as defined herein, and (3) between about 0.5 and 2.5 weight percent of a polymerizable reaction product formed from a monoethylenically unsaturated monomer having pendant basic functional groups, as defined herein, and a non-carboxylic acid, the proportions being selected to total 100 weight percent.

The copolymerizable monoethylenically unsaturated monomers useful for the purposes of the present invention are selected from the group consisting of acrylonitrile, alkyl esters of acrylic and methacrylic acids having from 1 to 18 carbon atoms in the alkyl group, and vinyl chloride.

Specific examples of such monomers include, but are not restricted to, methyl methacrylate, ethyl methacrylate, butyl methacrylate, octyl methacrylate, n-dodecyl methacrylate, n-octadecyl methacrylate, methyl acrylate, ethyl acrylate, propyl acrylate, butyl acrylate, phenyl methacrylate, cyclohexyl methacrylate, p-cyclohexylphenyl methacrylate, methacrylonitrile, methyl vinyl ketone, vinyl chloride, and mixtures thereof.

The copolymerizable monoethylenically unsaturated monomers defined herein should constitute from between about 4.5 and 19.5 weight percent of the monomer charge. Less than 4.5 weight percent of such compound(s) results in insolubility, and more than about 19.5 weight percent imparts inferior moistureproofness.

The monomers having basic functional groups useful for the purposes of the present invention may be selected from any monoethylenically unsaturated monomer copolymerizable with the monomeric mixture of the present invention and which has a basic functional group which is separate or pendant from the polymerizable unsaturated portion of the monomer and which is capable of forming salts with acids.

Among those preferred basic groups may be mentioned the amines and amides so that a preferred class of monomers includes, but is not restricted to, vinyl benzyl amine, $N^2,N^2$-diallylmelamine, the aminated alkyl acrylates, such as 2-aminoethyl methacrylate, and acrylamide.

The acids which may be employed are those acids capable of neutralizing the basicity of the basic groups pendant from the monomer. It is preferred that the acid and basic groups form an oil-soluble neutralized entity since it has been found that when a monomer having a pendant amine group is added to the polymerization recipe in the form of its water-soluble acid salt, the process is not operable because the copolymerizability is altered and the self-anchoring properties of the polymeric coating is reduced.

The acid should be employed in equivalent amounts to the basic groups used in the monomeric material, although a slight excess of acid may be tolerated. When less than equivalent amounts are used, the unneutralized basic groups are left free to cause degradation of the haloethylenic portions of the polymer chain.

Specific examples of acids useful for the purposes of the present invention include the mineral acids, such as sulfuric, nitric, and hydrochloric acids, and the oil-soluble organic sulfonic acids, such as methane sulfonic acid, benzene sulfonic acid, toluene sulfonic acid, and 2-naphthalene sulfonic acid. Carboxylic acids, such as acetic acid and benzoic acid, and the phenols have not been found useful for the purposes of the present invention.

The reaction product formed from a monoethylenically unsaturated monomer having pendant basic functional groups, and a non-carboxylic acid as defined herein, should constitute from between 0.5 and 2.5 weight percent of the monomer charge; below 0.5 weight percent the anchorage of the resulting copolymer under high moisture conditions is unsatisfactory and copolymers resulting from a reaction mixture containing in excess of 2.5 weight percent of the reaction product are not sufficiently soluble.

The monomers may be copolymerized by any known method to form the copolymers useful for the present invention. For example, the copolymerization may be conducted in aqueous emulsions containing a catalyst, e.g., potassium persulfate, and any of the well known emulsifying and/or dispersing agents. Alternatively, the copolymers may be prepared by polymerization of the monomeric components in bulk without added diluent, or the monomers may be reacted in appropriate organic solvent reaction media.

There is no critical order of addition of the various components of the monomeric mixture to be polymerized. A convenient manner of carrying out the process is to form the reaction product of monomer having pendant basic functional groups and non-carboxylic acids and then mixing the reaction product with the remaining monomers in an aqueous medium containing the catalyst. The various components of the monomeric mixture to be polymerized can also conveniently be premixed and added to the aqueous medium containing the catalyst and acid.

The terpolymers useful for the present invention are coated on the regenerated cellulose base film by any suitable technique, and may be applied as an organic solvent solution or from aqueous emulsion.

The following examples, wherein all parts and percentages are to be taken by weight, illustrate the present invention but are not to be construed as limiting its scope.

EXAMPLE 1

The following charge was placed in a glass reaction bottle:

| | Grams |
|---|---|
| Water | 200 |
| 30 percent hydrogen peroxide | 0.8 |
| Dihexyl ester of sodium sulfosuccinic acid | 1.36 |
| Ferric nitrate | 0.72 |
| 2-aminoethyl methacrylate hydrochloride | 1 |
| Acrylonitrile | 8 |
| Vinylidene chloride | 72 |

In preparing the above charge, the water and dihexyl ester of sodium sulfosuccinic acid are advantageously first solubilized and the resulting solution adjusted to a pH of 3.5 using nitric acid, with subsequent addition of the remaining components and polymerization of the so-formed charge by heating at a reaction temperature of 60° C. and maintaining such reaction temperature for a time period of 16 hours. The polymeric emulsion was then separately freeze-coagulated overnight and subsequently thawed, filtered, and dried.

The terpolymer thus formed was dissolved in tetrahydrofuran in amounts sufficient to form a lacquer comprising about 20 parts by weight of terpolymer in about 80 parts by weight of tetrahydrofuran and coated on a sheet of regenerated cellulose film about 0.0012 of an inch thick using a number 28 stainless steel wire-wound film casting rod.

The coated regenerated cellulose film was then placed in a circulating air oven operating at a temperature of 121° C. for a time period of 3 minutes and was subsequently conditioned at 50 percent relative humidity at a temperature of 25° C. for a time period of 16 hours.

A test sample was prepared by applying a fibrous tape about 0.75 of an inch wide and about 6 inches long to both the coating and the regenerated cellulose film, after which the sheet was cut into a strip corresponding to the dimensions of the tapered area. The tape covered strip of coated regenerated cellulose film was then placed in the jaws of an Instron tensile tester and peeled at a cross-head speed of 10 inches per minute and a chart speed of 2 inches per minute, under constant conditions of 65 percent relative humidity at a temperature of 22° C. The adhesion was measured as grams of force required to peel the coating from the regenerated cellulose.

A similar charge, excluding the 2-aminoethyl methacrylate hydrochloride, was prepared, polymerized, formed into a lacquer, coated on regenerated cellulose film, and tested as described herein for comparative purposes.

Table I illustrates the force in grams required to peel the polymeric vinylidene chloride coatings from the regenerated cellulose film, for each of the samples described herein.

*Table I*

| Run No. | 2-Aminoethyl Methacrylate Hydrochloride, Grams | Grams of Force Required to Separate Polymeric Vinylidene Chloride Coatings From Regenerated Cellulose Film |
|---|---|---|
| 1 | None | 13 |
| 2 | 1 | 31 |

EXAMPLE 2

The following charge was placed in a glass reaction bottle:

| | Grams |
|---|---|
| Water | 200 |
| 30 percent hydrogen peroxide | 0.8 |
| Dihexyl ester of sodium sulfosuccinic acid | 1.36 |
| Ferric nitrate | 0.72 |
| 2-aminoethyl methacrylate hydrochloride | 1 |
| Vinyl chloride | 16 |
| Vinylidene chloride | 64 |

Procedures used for preparation of the corresponding polymeric emulsion, lacquer coating, and coated regenerated cellulose test sample, as well as testing procedures, to determine the force in grams required to peel the polymeric vinylidene chloride coating from the regenerated cellulose film were those as described in Example 1.

A similar charge, excluding the 2-aminoethyl methacrylate hydrochloride, was prepared, polymerized, formed into a lacquer, coated on regenerated cellulose film, and tested as described herein, for comparative purposes.

Table II illustrates the force in grams required to peel the polymeric vinylidene chloride coatings from the regenerated cellulose film, for each of the samples described herein.

*Table II*

| Run No. | 2-Aminoethyl Methacrylate Hydrochloride, Grams | Grams of Force Required to Separate Polymeric Vinylidene Chloride Coatings From Regenerated Cellulose Film |
|---|---|---|
| 1 | None | 5 |
| 2 | 1 | 67 |

EXAMPLE 3

Following the procedure of Example 1, a terpolymer is prepared from the following initial charge:

| | Grams |
|---|---|
| Water | 200 |
| 30 percent hydrogen peroxide | 0.8 |
| Dihexyl ester of sodium sulfosuccinic acid | 1.36 |
| Ferric nitrate | 0.72 |
| Vinyl benzyl amine hydrochloride | 1 |
| Acrylonitrile | 8 |
| Vinylidene chloride | 72 |

Regenerated cellulose film coated with the resulting terpolymer dispersion has noticeably improved adhesion as compared to a corresponding film coated with a copolymer dispersion composed of corresponding amounts of vinylidene chloride and acrylonitrile.

EXAMPLE 4

Following the procedure of Example 2, a terpolymer is prepared from the following initial charge:

| | Grams |
|---|---|
| Water | 200 |
| 30 percent hydrogen peroxide | 0.8 |
| Dihexyl ester of sodium sulfosuccinic acid | 1.36 |
| Ferric nitrate | 0.72 |
| Vinyl benzyl amine hydrochloride | 1 |
| Vinyl chloride | 16 |
| Vinylidene chloride | 64 |

Regenerated cellulose film coated with the resulting terpolymer dispersion has noticeably improved adhesion as compared to a corresponding film coated with a copolymer dispersion composed of corresponding amounts of vinylidene chloride and vinyl chloride.

The results illustrated by the preceding examples indicate that moistureproof, heat-sealable, transparent coating compositions comprising as the film-forming components essentially a terpolymer obtained by polymerizing the prescribed amounts of (1) vinylidene chloride, (2) acrylonitrile or vinyl chloride, and (3) the polymerizable reaction products formed from a monoethylenically unsaturated monomer having pendant basic functional groups and a non-carboxylic acid, as defined herein; have noticeably greater adhesion to regenerated cellulose film as compared to coating compositions comprising as the film-forming component essentially a copolymer obtained by polymerizing the indicated amounts of (1) vinylidene chloride and (2) acrylonitrile or vinyl chloride.

Similar good results are obtained by coating a base film or sheet of regenerated cellulose, by any convenient coating technique, with a moistureproof, heat-sealable, transparent coating composition comprising as the film-forming components essentially a terpolymer obtained by polymerizing a mixture of (1) between about 80 and 93 weight percent of vinylidene chloride, (2) between about 4.5 and 19.5 weight percent of a copolymerizable monoethylenically unsaturated monomer, as defined herein, and (3) between about 0.5 and 2.5 weight percent of a polymerizable reaction product formed from a monoethylenically unsaturated monomer having pendant basic functional groups, and a non-carboxylic acid as defined herein, the proportions being selected to total 100 percent.

What is claimed is:

1. A moistureproof, heat-sealable, wrapping tissue comprising regenerated cellulose film having a self-anchored coating comprising essentially a terpolymer obtained by polymerizing a mixture of (1) between about 80 and 93 weight percent of vinylidene chloride, (2) between about 4.5 and 19.5 weight percent of a copolymerizable monoethylenically unsaturated monomer and (3) between about 0.5 and 2.5 weight percent of at least one polymerizable material selected from the group consisting of a non-carboxylic acid salt of vinyl benzyl amine and 2-aminoethyl methacrylate.

2. The wrapping tissue of claim 1, wherein said copolymerizable monoethylenically unsaturated monomer is acrylonitrile.

3. The wrapping tissue of claim 1, wherein said copolymerizable monoethylenically unsaturated monomer is vinyl chloride.

4. The process which comprises (I) coating a transparent base film of regenerated cellulose with a self-anchored coating dissolved in an organic solvent therefor, said coating comprising essentially a terpolymer of (1) between about 80 and 93 weight percent of vinylidene chloride, (2) between about 4.5 and 19.5 weight percent of a copolymerizable monoethylenically unsaturated monomer and (3) between about 0.5 and 2.5 weight percent of at least one polymerizable material selected from the group consisting of a non-carboxylic acid salt of vinyl benzyl amine and 2-aminoethyl methacrylate and (II) heating the coated base films to remove the solvent.

5. The process of claim 4, wherein said copolymerizable monoethylenically unsaturated monomer is acrylonitrile.

6. The process of claim 4, wherein said copolymerizable monoethylenically unsaturated monomer is vinyl chloride.

References Cited by the Examiner

UNITED STATES PATENTS

| 2,541,167 | 2/51 | Pitzl | 260—80.5 |
| 2,732,363 | 1/56 | Coover et al. | 260—80.5 |
| 2,899,263 | 8/59 | Nuessle et al. | 117—145 |
| 2,985,543 | 5/61 | MacNeill | 117—144 |
| 3,018,197 | 1/62 | Covington et al. | 117—145 |

RICHARD D. NEVIUS, *Primary Examiner.*